United States Patent
Cooper et al.

(10) Patent No.: US 7,038,463 B2
(45) Date of Patent: May 2, 2006

(54) METHOD AND APPARATUS FOR BATTERY RECONFIGURATION FOR RADIO CONTROL APPLICATION

(76) Inventors: Ted J. Cooper, 746 Silver Tip Way, Sunnyvale, CA (US) 94086; Michael R. Frederick, 20639 SW. Brackerwood La., Beaverton, OR (US) 97006

( * ) Notice: Subject to any disclaimer, the term of this patent is extended or adjusted under 35 U.S.C. 154(b) by 125 days.

(21) Appl. No.: 10/632,945

(22) Filed: Aug. 1, 2003

(65) Prior Publication Data

US 2005/0042505 A1  Feb. 24, 2005

(51) Int. Cl.
*G01R 31/04* (2006.01)
*H02J 7/00* (2006.01)

(52) U.S. Cl. .................. 324/538; 320/116; 320/122

(58) Field of Classification Search ........ 324/426–437, 324/538; 320/116, 122
See application file for complete search history.

(56) References Cited

U.S. PATENT DOCUMENTS

| | | | | |
|---|---|---|---|---|
| 4,160,253 A * | 7/1979 | Mabuchi et al. | ............ | 340/825 |
| 4,626,052 A * | 12/1986 | Rumble | ....................... | 439/173 |
| 5,240,787 A * | 8/1993 | Goldschmidt et al. | ......... | 429/97 |
| 5,308,717 A * | 5/1994 | Gordin | .......................... | 429/99 |
| 5,644,209 A * | 7/1997 | Chabbert et al. | ............ | 320/122 |
| 5,656,915 A * | 8/1997 | Eaves | .......................... | 320/118 |
| 5,686,811 A * | 11/1997 | Bushong et al. | ............. | 320/110 |
| 6,014,013 A * | 1/2000 | Suppanz et al. | ............. | 320/122 |
| 6,062,884 A * | 5/2000 | Messimer et al. | ........... | 439/172 |
| 6,106,971 A * | 8/2000 | Spotnitz | ....................... | 429/98 |
| 6,157,167 A * | 12/2000 | Schwartz et al. | ............ | 320/122 |
| 6,194,867 B1 * | 2/2001 | Cummings et al. | .......... | 320/119 |
| 6,501,197 B1 * | 12/2002 | Cornog et al. | ............... | 307/150 |
| 6,548,986 B1 * | 4/2003 | Jakubowski | ................. | 320/111 |
| 6,638,086 B1 * | 10/2003 | Lavender et al. | ............ | 439/171 |
| 6,650,967 B1 * | 11/2003 | Got et al. | ..................... | 700/286 |

\* cited by examiner

*Primary Examiner*—Vincent Q. Nguyen
*Assistant Examiner*—John Zhu

(57) ABSTRACT

A method and apparatus to reconfigure battery systems for r/c model vehicles that permit the rapid reconfiguration of battery cells to connect to many different vehicle systems with various serial and parallel configurations employing standard r/c battery connectors according to the user's present needs. In one instance of the application individual battery cells can independently be discharged and/or recharged.

20 Claims, 5 Drawing Sheets

8 cell "Brick" configuration 300

8 cell "long line" configuration 301

8 cell "balance forward" configuration 302

METHOD AND APPARATUS FOR BATTERY RECONFIGURATION FOR RADIO CONTROL APPLICATION

FIELD OF THE INVENTION

The present invention relates to how a battery system powers both the electronics and a motor to propel a vehicle. More particularly, this invention pertains to the method and apparatus for connecting various numbers of battery cells to the battery system to optimize its performance according to the user's present needs.

BACKGROUND

Radio control (r/c) cars, boats, airplanes, submarines, etc. all have electric motors to make them move or support their movement. The more battery cells that are connected in a series configuration, the more voltage and/or speed that can be delivered to the vehicle. Connecting more battery cells in a parallel configuration allows more amperes and power to be delivered to the vehicle. A combination of series and parallel connections of the battery cells allows the user to configure an optimum power system for a vehicle in terms of weight, size, and the duration that the motor can be activated.

Since the commercialization of miniature vacuum tubes in the 1950s, hobbyists have tried to make model airplanes, boats, and cars function under remote user control by the activation of switches and knobs to control the direction and rate of speed of the model. The early r/c hobbyists all used glow fuel engines to power the vehicles because electric motors were too heavy, slow, and expensive to consider as the primary propulsion device. Batteries located in the vehicles powered electronic modules which converted radio frequency (rf) signals from the user's transmitter into specialized control signals. These signals were sent to a servo unit which turned front wheels on cars, or elevator and rudder surfaces on planes, or tillers and rudders on boats.

As battery and motor technology advanced, the r/c hobbyist could eliminate the noisy, fuel-driven engine and employ quiet electric motors to propel the vehicle. With the invention of the transistor and integrated circuits, the hobbyist could use a single set of batteries to power all the electrical circuits on a vehicle. This means that the receiver, motor speed control, servos, and drive motor all shared the same battery power source. This greatly reduced the weight of the model and simplified the number of parts a hobbyist had to buy to create a remote controlled vehicle.

Advances in electronics miniaturization and foam material processing have permitted the cost of r/c models to drop significantly. It is quite typical for a model r/c airplane flyer to have 4 to 10 fully assembled planes at the airfield during a session. Similarly, electric model car enthusiasts typically have several cars available to enter various types of races—one for each type of racing class. The same is true for boating enthusiasts. Wind sailboats, "cigar-boat" racers, and hydroplanes are available as needed for the different types of racing. All of these vehicles need a battery system. Typically a separate battery is needed for each device to match the size, weight, and power requirements of the specific vehicle in which it is used. Especially in the low-cost foam airplanes that currently exist in the r/c hobby field, the cost of batteries for each model is now equal or greater than the cost of the model's electronics. The present invention describes a method and an apparatus for quickly configuring battery cells so that they can be moved from system to system with a minimum of difficulty, and thus lowers the cost of operation of multiple vehicles.

SUMMARY OF THE INVENTION

According to one aspect of the invention, a battery system is created for r/c model vehicles that permit the rapid reconfiguration of battery cells to connect to many different vehicle systems with various serial and parallel configurations.

Other features and advantages of the present invention will become apparent from the accompanying drawings, and from the detailed description, which follows below.

BRIEF DESCRIPTION OF THE DRAWINGS

The features and advantages of the present invention are illustrated by way of example and not intended to be limited by the figures of the accompanying drawings, in which like references indicate similar elements and in which:

FIG. 2C depicts the battery cells as rectangular boxes for ease of drawing. When heat-shrink wrapping is applied, the combined battery cells more closely resemble rounded-edge boxes than individual cylinders. The two mating connectors 201 and 202 are a matched male-female set. It is typical for the battery to have the female connector to minimize the possibility of electrical shorting when disconnected.

DETAILED DESCRIPTION

According to the embodiments described herein, a method and apparatus are described in which a plurality of r/c model vehicles can be powered by a single battery system. The battery system allows different number of serial and parallel cells to be quickly reconfigured to match the voltage and power requirements of the vehicle.

Battery cells currently come in four generic classes: Alkaline, Nickel-Cadmium (NiCd), Nickel-Metal-Hydride (NiMh), and Lithium. Additional classes (like zinc-air) will be added in the future for hobbyist uses. The Alkaline (which is the common household flashlight battery type) produces 1.5 volts nominally when new. It is rarely used in the hobbyist market because it is typically not rechargeable and thus very expensive to employ on a long-term basis. Both the NiCd and NiMh produce 1.2 volts per cell and are the dominant types today in the r/c market. They are rechargeable and can typically be re-used 200–500 times before they need to be replaced. They have a very low cost of long-term operation. Lithium (both the metal-ion type and the polymer type cells) produce 3.7 volts per cell and are quickly becoming the battery of choice for small airplanes, boats, and helicopters because it has a great weight to power ratio. This provides long vehicle operation duration. They are rechargeable approximately 200–300 times before needing replacement and the Lithium cells are currently about 50% more expensive than their equivalent power NiCd cells. However, the Lithium polymer cells typically weigh ½ to ⅓ as much as their NiCd counterparts and thus are very desirable in aircraft and water vehicles where reduced weight has high value.

Figure 1:
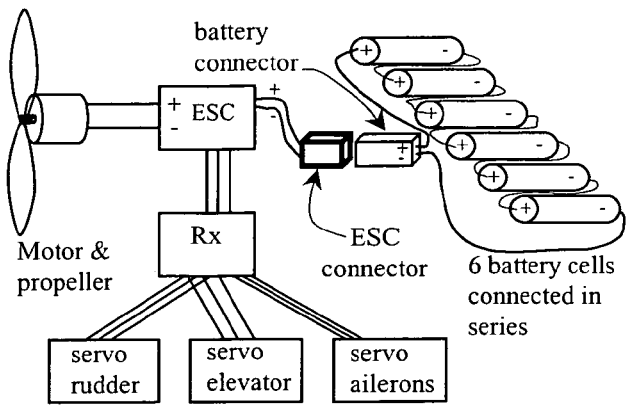
FIG. 1 depicts an exemplary r/c model airplane electrical wiring to demonstrate the electrical components in a brushed model airplane in accordance with prior art. The ESC is an Electronic Speed Controller that provides power to the receiver (Rx) and to the motor once the Rx gives back a signal to the ESC telling what average current to apply to the motor. The servos obtain their power from the Rx to drive their internal motors and gearboxes to the desired position.

Battery cells are typically connected in series to provide an operating voltage range between 4 to 30 volts. Most brushed electric motors used for propulsion operate with a range of 6.0 to 10.0 volts. Most r/c electronics systems can operate anywhere in the 3.7 to 12 volt range. Highly efficient "brushless" motors for propulsion typically need higher voltages (9 to 30 volts). FIG. 1 shows schematically how a typical brushed r/c model airplane would be configured for a battery system that provides 6 cells of NiMh. The 6 cells provide 7.2 volts to an Electronic Speed Controller (ESC) which provides a regulated voltage to the r/c receiver (Rx) which in turn provides pulsed voltages to the servos that control the elevator and rudder. The ESC provides pulsed voltages from the battery to the motor according to the Rx signals which are controlled through the pilot's transmitter. The motor draws the most power from the battery system and must be "shut down" when the battery system voltage drops to a pre-determined cut-off voltage. This is required so that if the pilot does not land the plane before the battery system voltage goes too low, that the propulsion motor will turn off but that the servos still have enough power to land the plane safely.

For most r/c racing hobbyists, motors are a type of consumable that are given excessive voltages so that they produce maximum power for short periods of time. It is a common practice in model r/c car racing to replace a vehicle's motor every two races because excessive current has burned the brushes and melted the internal wires. This excessive current is often the deciding factor in whether a car wins or not. The motor typically costs less than a battery system. Racers often "add" one or more additional battery cells in series to the standard battery configuration to gain additional power for a race. In a standard 6 cell r/c racing car configuration, a driver might have a 6 cell battery pack for practicing, a 7 cell pack for hard driving to refine his driving technique during racing, an 8 cell pack for typical racing conditions, and a 9 cell pack to use only when the final race for the championship is at stake. Each battery pack is hard wired to have the full complement of cells, and has a special connector which mates with the connector on the ESC. A racer often has more money expended in a set of batteries than in the racing vehicle itself. The financial difficulty becomes even more pronounced if the racer has three or four different cars that are entered in different events during the day. Each car system needs its own set of batteries for each event.

The same plurality of battery cells exists for r/c boaters, airplane pilots, and helicopter operators. In the r/c flying models, the owner oftentimes has to add additional battery systems in parallel to the standard configuration of series connected batteries in order to increase the total power available to the system. This is known as an "XsYp" system where X is the number of cells connected in series and Y is the number of "series" configured sets that are finally connected in parallel to give additional power. The need for the "XserialYparallel" system exists because battery cells often come in very small packages. Ideally, huge battery cells should exist so that a single series connected battery system is sufficient. However, motorized gliders often need 30 to 50 battery cells wired in an "XsYp" manner to produce the required power for racing events. Such battery systems can cost many hundreds of dollars to configure. And multiple systems may be needed with increased serial cell counts to produce the excessive voltages needed to win races.

Figure 2A:
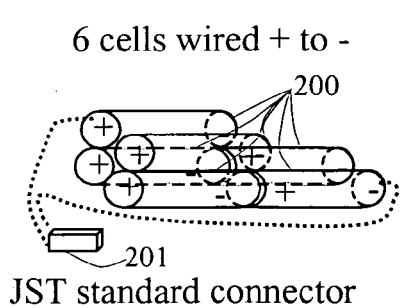
FIG. 2A depicts a 6 cell NiMh configuration that is the current state of the art. It has been configured as in a plane of four adjacent cells on the bottom row and then two additional cells are placed in mirror image on the next row. The choice of the JST connector is a typical example of what a 6-cell r/c model airplane would use. Any of the other standard connectors (Dean's, Tamiya, Anderson Pole, AstroFlight ZeroLoss, etc.) could also be used. All r/c battery packs are either covered with tape or shrouded by heat-shrink plastic to ensure that the wires connecting the individual cells are not exposed. This is also necessary to give physical strength to the battery system so they do not disassemble in a crash.
Figure 2B:
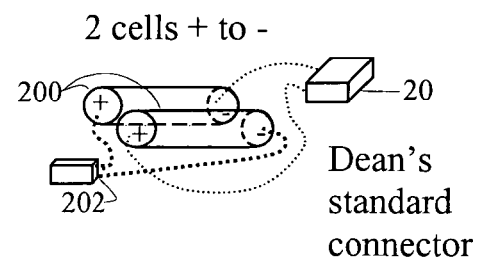
FIG. 2B depicts a 2 cell NiMh configuration that is used to extend the 6 cell battery subsystem shown in FIG. 2A. The connector 201 from the 6 cell subsystem mates with a matching connector 202 in the 2 cell subsystem to extend the serial connections so that now 8 cells deliver their final voltage to the output connector 203.

FIG. 2A shows a battery system with six cells 200 connected in series which terminate to a standard connector 201. This is the current state of the art where each of the cells 200 are soldered in a positive to negative daisy-chain manner to increase the voltage, and the output is available at 201 to connect to an ESC which will power the electronics and drive a motor. FIG. 2B shows an additional two cells with a connector 202 that mates with the six cell system in FIG. 2A 201. The connector 203 is the final output of combining the six cell with the two cell subsystem to produce an eight cell system FIG. 2C. The battery system in FIG. 2C can be used in the same airplane, car, boat, or helicopter as shown in FIG. 2A but now produces more power, because of increased voltage, to provide increased performance and win races. There are many r/c devices which only accept six cell systems, and have a special connector 201 which is required to mate with the ESC. In a different airplane, car, boat, or helicopter, an eight cell system may be required. These vehicles typically require a larger capacity connector 203 needed to carry the larger amperage and voltage. In its simplest form, the current invention allows a single battery cell system to be used in either r/c configuration without requiring two separate battery systems for each configuration. One unique advantage of the current invention is that the specialized connectors needed to connect to either an ESC or a motor are integrally part of the design. Connectors are typically of the JST type or the Dean's Ultra connectors which handle relatively large current flows without heating, have a high resistance to vibrating free during normal operation, and permit the battery systems to be thrown free from a crash of an airplane or rollover of a car. This last feature is essential to stop a propeller from spinning or wheels from rotating so fast that the vehicle motor is destroyed during a mishap.

A second advantage of the current invention is that the wires connecting the six cell to the two cell subsystem allows the final battery configuration to be adjusted in physical layout to match the physical constraints of the model into which the battery system is placed. FIG. 3 illustrates three different configurations of the FIG. 2C system. Configuration 300 shows the additional two cells stacked in the "void" of the FIG. 2A system. This new configuration is often called a "brick" pattern and readily fits into the fuselage and sponsons of most airplanes and boats, respectively. The configuration 301 has the two addition cells oriented to fit behind the six cell set. Such a configuration might be needed in very narrow portions of the fuselage, or when the balance of the airplane or boat needs the batteries distributed over a longer axis. Configuration 302 has the two additional cells stacked upon the thick portion of FIG. 2A battery cells. This configuration is often needed in airplane and helicopter models where the balance point of the vehicle is needed as far forward inside the model as possible. The current invention allows the battery configurations to be adjusted to meet space and balance point requirements for each system into which the cells are installed. Standard battery systems are rigidly held together with tape or heat-shrink tubing and cannot be reconfigured to take new shapes.

A third advantage of the current invention is that repairs of worn-out or damaged battery subsystems are easier to effect. When a battery pack begins to fail to hold a useful charge, typically one or two batteries are defective and the rest of the system cells have 30–40% of their battery life still available. The current invention allows a user to measure the voltages and currents present in both the FIG. 2A part of the system separately from the FIG. 2B part of the system. Whichever subsystem is failing can be repaired much easier than traditional r/c battery system where all the cells must be dismantled to perform the tests. This is especially true when there are parallel subsystems involved as will be described next.

Figure 4:
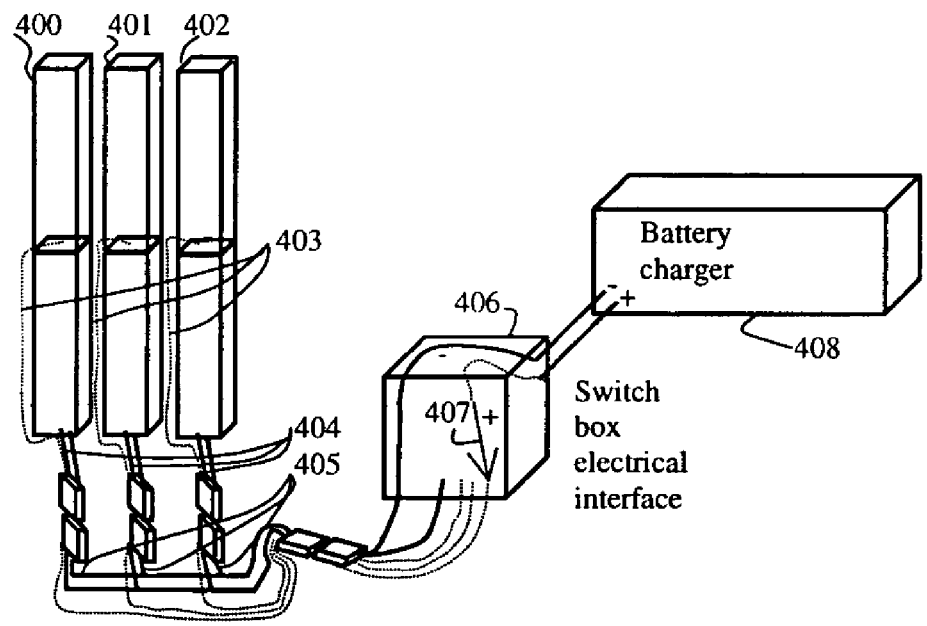
FIG. 4 depicts a "2s3p" battery system configuration along with a switch box electrical interface and battery charger. The electrical interface allows the individual cells to be discharged and/or recharged independently.

FIG. 4 shows a 2s3p system where each subsystem has two serial cells connected together and then three of these subsystems are connected in parallel to form the final battery system. Each of the 2s (two serial) subsystems are identical and have a connector that would allow that subsystem to be used in a vehicle that only needs two serial cells to be functional. By connecting the three subsystems 400, 401, 402 in parallel, they triple the amount of current that the system can deliver to the model. Large electric-powered glider aircraft often have 10s15p NiMh battery cells needed to provide several hundred amperes of sustained power for twenty minutes of motor duration. There are no NiMh cells currently large enough to provide the large current drain, and so a large number of parallel subsystems are needed. Another reason for the parallel subsystems is to allow various packing configurations to fit in the tapering cross-section of the glider's fuselage. The current invention allows all of the parallel subsystems to be identical, and to be used in other aircraft with the proper connector installed. The added advantage is that if one parallel subsystem fails, the replacement of that subsystem is far less expensive than replacing the entire system. Bad crashes in r/c airplanes and cars often destroy only a few batteries located in the immediate impact location. The other batteries usually survive. The current invention allows only a minimal number of subsystems to be replaced or repaired.

Batteries have a specific voltage for each cell type: 1.2 volts for NiCd and NiMh, and 3.7 volts for Lithium. When they are configured in series and parallel systems, problems can arise when they are charged as a group rather than each cell individually. During battery discharge, certain cells will discharge more quickly than others. After many charge-discharge cycles in the vehicle, the battery system can have certain cells that do not get fully recharged because the adjacent cells in the series charge (and discharge) more quickly than others, and cause the charging process to terminate early. This results in some of the series connected cells not having the same voltage and current storage capacity compared to other sets used in a parallel configuration. In the literature this is known as "battery reversal" and "battery memory effect problems". This typically appears only after 5 or more charge-discharge cycles, or when eight or more cells are connected in series. This can be a serious problem for battery systems used in racing conditions because the reduced power from certain serially connected cells can easily mean the difference between finishing first or finishing third in a race. Over a long period of time, this can render some battery systems unusable.

Figure 2C:
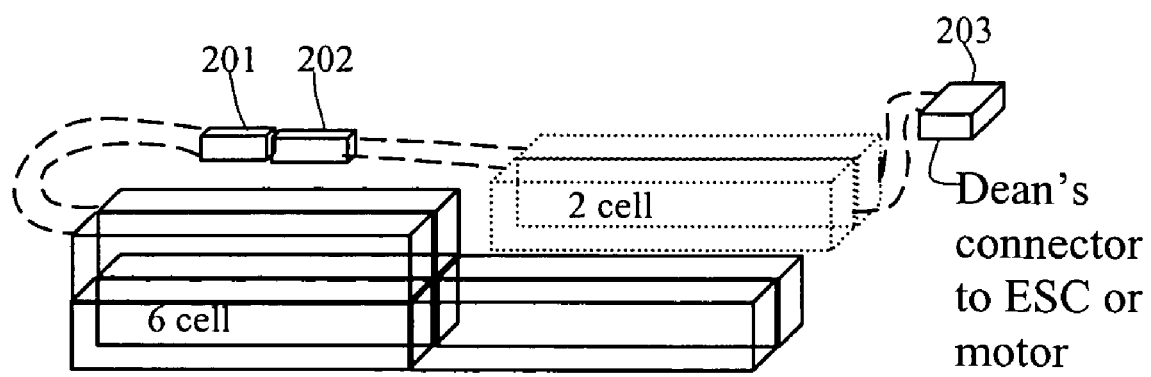
FIG. 2C depicts the combined subsystems of FIG. 2A and FIG. 2B having more available voltage. The output connector 203 can either match the type used in FIG. 2A so that is used in the same r/c vehicle as FIG. 2A, or it can be a different standard connector that would be employed in a different r/c vehicle.
Figure 3A:
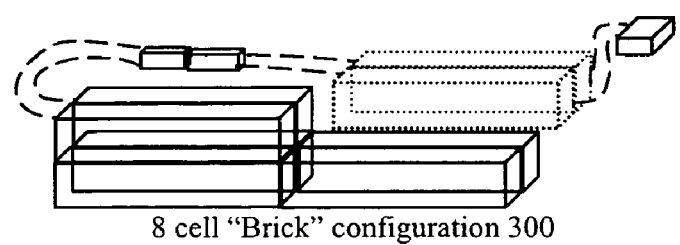
FIGS. 3A, 3b, and 3C depict three different configurations of the 8 cell battery comprised of a 6 cell and a 2 cell "add-on" subsytem. The three different orientations of the 2 cell "add-on" subsystem permit the battery to be used when physical dimension and balance point requirements change from r/c model to model.
Figure 3B:
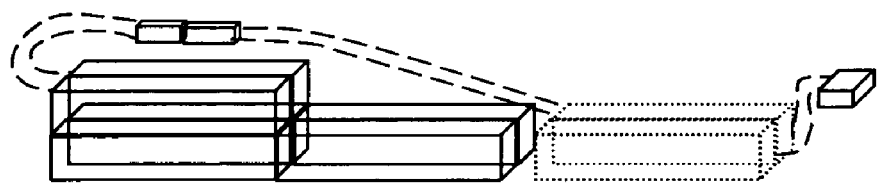
Figure 3C:
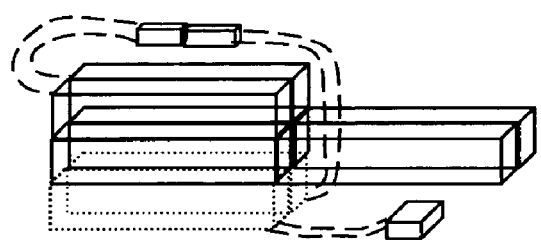

A modification of the wiring shown in FIG. 2C, which is shown in FIG. 4, permits each cell to be charged independently without disassembling the entire battery system. The wires 403 are connected to each cell's positive terminal. The standard group wires 404 and 405, plus the individual 403 wires, permit any single cell to be charged independently of any other cell. Very small wires can be used for the individual 403 wires since they will carry very small current loads. Every $5^{th}$ to $10^{th}$ charging cycle, a special cable is connected to the battery subsystem which makes use of the individual 403 wires in conjunction with the larger 404 and 405 wires. The battery is first discharged and then re-charged at 1/20 of its specified current capacity. This process typically takes 20 hours and can be accomplished during a day when the vehicle is not being used. The same wiring process that makes up the FIG. 2A and FIG. 2B processes would be used to insure that the individual cell charging feature also has the "XsYp" capabilities of the current invention.

The special cable connects to an electrical interface 406 that uses mechanical relays or electrical switches 407 to connect each cell to the battery charger 408 one at a time to perform the standard discharge followed by the standard charge operation. Once the first individual cell is cycled, the electrical interface then advances to the next battery cell and the process is repeated. This continues until all cells have been independently cycled to bring them up to their full capacity. Special circuitry in the electrical interface box can record the discharge and charge amounts for each cell and display them to the user. Cells that are seriously low in capacity can be identified through this process and replaced. The interface can also identify when a significant number of the individual cells are so reduced in charge capacity that the entire subsystem should be replaced.

The wiring interface for FIG. 4 can either be part of the connector system used to carry the 404 and 405 large capacity wires, or they can be independent connectors that have a small unique connector attached to the covering of either the FIG. 2A for FIG. 2B subsystem. This later connector then attaches to the individual 403 wires and can be very light weight. In this configuration, no wires need to extend beyond the battery subsystem outer shell. This reduces system cost and complexity.

Figure 5:
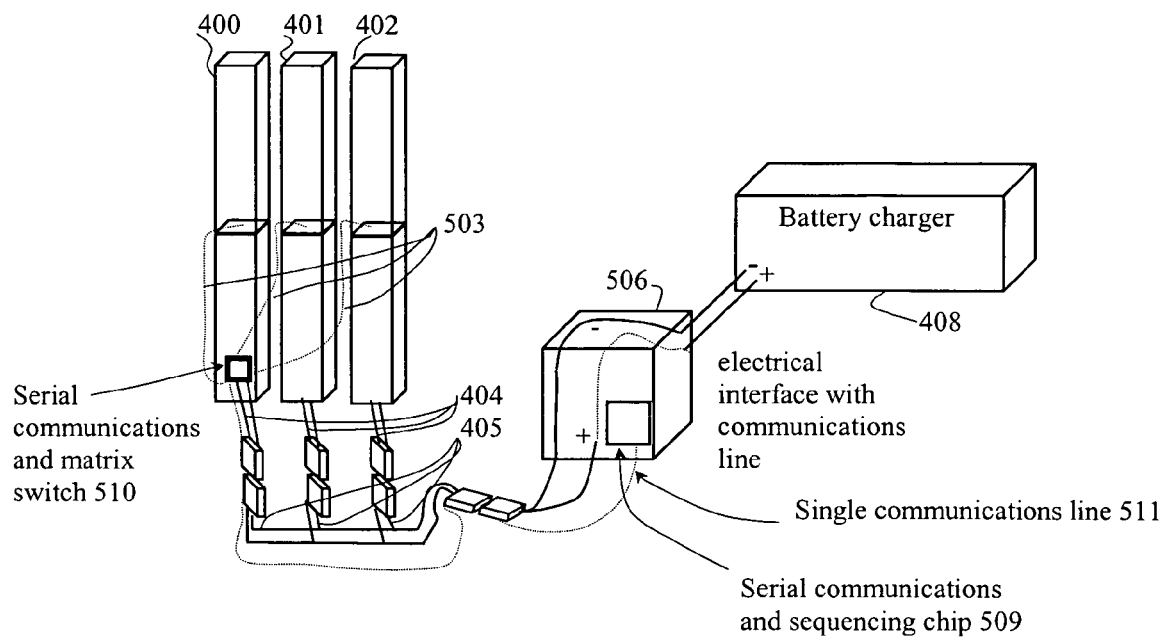
FIG. 5 depicts a "2s3p" battery system configuration along with an embedded processor to minimize the number of individual wires going from the electrical interface to the battery system.

FIG. 5 shows a variation on the individual wiring of cells depicted in FIG. 4. In this case, an integrated circuit 510, with an embedded microprocessor and a series of matrix configured FET switches, is attached inside each battery system. A single control line 511 detects a serial coded pulse message from the electronic interface 506 that is attached to the battery charger 408. The programmed message from the serial electronics communication chip 509 tells the integrated circuit inside the battery subsystem which set of FET switches to turn on so that a specific battery cell is either discharged or charged. When the battery charger tells the electronic interface that the operation is complete for that individual cell, the electronic interface sends a new pulse-coded message to the integrated circuit 510 to open the previous set of FET switches and now close a new set corresponding to the next battery cell to be processed. This process would continue until all cells are discharged and then recharged to their full capacity. The advantages of the method in FIG. 5 are that a total of only three wires (404,405,503) need to go from the electronic interface to the battery system. This reduces weight and the chances of broken wire connections. The disadvantage is the added cost of a microprocessor and FET switch matrix inside every battery system. However, in mass production, the method of FIG. 5 will offer the most flexibility since less expensive connectors could be used, and faster charging times could be accomplished through "strobing" effects where multiple cells could be charged at the same time once they are matched to have the same capacity. Also the cost of the integrated circuit and FET matrix would drop rapidly as the volume of battery systems increase.

FIGS. 2, 4 and 5 illustrate the method and apparatus used to construct a flexible and extensible battery system for use in r/c model vehicles. All of the battery cells used in this invention are wired together using solder joints. Mechanical connection of r/c battery systems is not viable because of corrosion, dirt, and weight considerations. The dominant reason why battery systems need a soldered joint is that in car and model airplane applications, stresses of up to five times the acceleration of gravity can be placed on the battery systems during intense maneuvers. If the batteries become electrically separated for even one millisecond, the control systems for steering will typically result in a crash. In the foregoing specification, the invention has been described with reference to specific exemplary embodiments thereof. It will, however, be evident that various modifications and changes may be made thereto without departing from the broader spirit and scope of the invention as set forth in the appended claims. The specification and drawings are, accordingly, to be regarded in an illustrative sense rather than in a restrictive sense.

What is claimed is:

1. A method to facilitate reconfiguring electrical battery power delivered to a motor for a radio controlled model, comprising:

providing a first group of battery cells, wherein the battery cells in the first group are connected via permanent electrical connection, and wherein the battery cells in the first group are securely held together;

providing a second group of battery cells, wherein the battery cells in the second group are connected via permanent electrical connections, and wherein the battery cells in the second group are securely held together;

providing a first standard electrical connector that removably electrically couples the first group of battery cells to the second group of battery cells; and providing a second standard electrical connector that removably electrically couples the second group of battery cells to an electronic speed controller, wherein the electronic speed controller is electrically coupled to the motor of said radio controlled model.

2. The method of claim 1 wherein the first and the second standard connectors are different standard types.

3. The method of claim 1 further comprising:

providing a first wire directly coupled to a first terminal of a particular battery cell in the first group of battery cells; and providing a second wire directly coupled to a second terminal of the particular battery cell;

wherein the first and the second wires conduct an electrical current from a battery charger so as to perform an electrical charging operation on the particular battery cell.

4. The method of claim 1 further comprising:

providing a first integrated circuit; and providing a second integrated circuit coupled to the first integrated circuit via a control line;

wherein a first control signal transmitted from the first integrated circuit via the control line to the second integrated circuit controls the charging operation on the particular battery cell.

5. The method of claim 1, further comprising:

using the first standard electrical connector to removably electrically couple the first group of battery cells to the second group of battery cells; and using the second standard electrical connector to removably electrically couple the second group of battery cells to the electronic speed controller.

6. The method of claim 5, further comprising:

decoupling the first group of battery cells from the second group of battery cells;

decoupling the second group of battery cells from the electronic speed controller; and using the first and the second standard electrical connectors to directly couple the first group of battery cells to the electronic speed controller.

7. A reconfigurable radio control model battery system comprising:

a first group of battery cells, wherein the battery cells in the first group are connected via permanent electrical connection, and wherein the battery cells in the first group are securely held together;

a second group of battery cells, wherein the battery cells in the second group are connected via permanent electrical connection, and wherein the battery cells in the second group are securely held together;

wherein the first group of battery cells is removably electrically coupled via a first standard connector to the second group of battery cells, and wherein the second group of battery cells is removably electrically coupled via a second standard connector to an electronic speed controller for a radio controlled model motor.

8. The system of claim 7, wherein the first and the second standard connectors are different standard types.

9. The system of claim 7, further comprising:

a first wire directly coupled to a first terminal of a particular battery cell in the first group of battery cells; and a second wire directly coupled to a second terminal of the particular battery cell;

wherein the first and the second wires conduct an electrical current from a battery charger so as to perform an electrical charging operation on the particular battery cell.

10. The system of claim 9, wherein the charging operation comprises discharging the particular battery cell.

11. The system of claim 9, further comprising:
a first integrated circuit; and
a second integrated circuit coupled to the first integrated circuit via a control line;
wherein a first control signal transmitted from the first integrated circuit via the control line to the second integrated circuit controls the charging operation on the particular battery cell.

12. The system of claim 11, wherein a second control signal transmitted from the first integrated circuit via the control line to the second integrated circuit controls a charging operation for a second particular battery cell in the first group of battery cells.

13. The system of claim 11, wherein the second integrated circuit is positioned inside the first group of battery cells.

14. A reconfigurable radio control model battery system comprising:
a first group of battery cells, wherein cells in the first group are connected via permanent electrical connection, and wherein the first group of battery cells are securely held together;
a second group of battery cells, wherein cells in the second group are connected via permanent electrically connection, and wherein the second group of battery cells are securely held together;
wherein the first group of battery cells is removably electrically coupled via a first standard connector to and electronic speed controller for a radi controlled model motor, and wherein the second group of battery cells is removably electrically coupled via a second standard connected to the electronic speed controller.

15. The system of claim 14, wherein the first and the second standard connectors are different standard types.

16. The system of claim 14, further comprising:
a first wire directly coupled to a first terminal of a particular battery cell in the first group of battery cells;
a second wire directly coupled to a second terminal of the particular battery cell;
wherein the first and the second wires conduct an electrical current from a battery charger so as to perform an electrical charging operation on the particular battery cell.

17. The system of claim 16, wherein the charging operation comprises discharging the particular battery cell.

18. The system of claim 16, further comprising:
a first integrated circuit; and
a second integrated circuit coupled to the first integrated circuit via a control line;
wherein a first control signal transmitted from the first integrated circuit via the control line to the second integrated circuit controls the charging operation on the particular battery cell.

19. The system of claim 18, wherein a second control signal transmitted from the first integrated circuit via the control line to the second integrated circuit controls a charging operation for a second particular battery cell in the first group of battery cells.

20. The system of claim 18, wherein the second integrated circuit is positioned inside the first group of battery cells.

* * * * *

UNITED STATES PATENT AND TRADEMARK OFFICE
CERTIFICATE OF CORRECTION

| | | |
|---|---|---|
| PATENT NO. | : 7,038,463 B2 | |
| APPLICATION NO. | : 10/632945 | |
| DATED | : May 2, 2006 | |
| INVENTOR(S) | : Ted J. Cooper and Michael R. Frederick | |

It is certified that error appears in the above-identified patent and that said Letters Patent is hereby corrected as shown below:

Please delete in Col. 9 lines 33-34 currently read: "connector to and electronic speed controller for a radi controlled model.

Please insert in Col. 9 lines 33-34 currently read: " connector to an electronic speed controller for a radio controlled model.

Signed and Sealed this

Twenth-second Day of August, 2006

JON W. DUDAS
*Director of the United States Patent and Trademark Office*